(12) United States Patent
Kamijo

(10) Patent No.: US 12,118,155 B2
(45) Date of Patent: Oct. 15, 2024

(54) INFORMATION PROCESSING DEVICE AND INFORMATION PROCESSING METHOD

(71) Applicant: CANON KABUSHIKI KAISHA, Tokyo (JP)

(72) Inventor: Hiroaki Kamijo, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/459,085

(22) Filed: Aug. 31, 2023

(65) Prior Publication Data

US 2024/0077958 A1 Mar. 7, 2024

(30) Foreign Application Priority Data

Sep. 2, 2022 (JP) .................... 2022-140070

(51) Int. Cl.
*G09G 5/00* (2006.01)
*G06F 3/01* (2006.01)
*G06F 3/0346* (2013.01)
*G06F 3/0354* (2013.01)

(52) U.S. Cl.
CPC ............ *G06F 3/0354* (2013.01); *G06F 3/014* (2013.01); *G06F 3/0346* (2013.01)

(58) Field of Classification Search
CPC .......... G06F 3/011; G06F 3/012; G06F 3/014; G06F 3/0346; G06F 3/0354; G06F 3/03547; G06F 3/0383; G06F 2203/0331
See application file for complete search history.

(56) References Cited

U.S. PATENT DOCUMENTS

| | | | | |
|---|---|---|---|---|
| 7,331,856 B1 * | 2/2008 | Nakamura | ............ | A63F 13/235 463/7 |
| 7,690,994 B2 * | 4/2010 | Dohta | .................. | G06F 3/0325 345/161 |
| 8,784,203 B2 * | 7/2014 | Zalewski | .............. | A63F 13/833 463/31 |
| 9,525,906 B2 * | 12/2016 | Lai | .................... | H04N 21/41265 |
| 10,137,370 B2 * | 11/2018 | Aizawa | ................. | G06F 3/0338 |
| 10,241,573 B2 * | 3/2019 | Mallinson | ............. | A63F 13/235 |
| 11,000,763 B2 * | 5/2021 | Minamino | .............. | A63F 13/40 |
| 2002/0065121 A1 * | 5/2002 | Fukunaga | ............. | A63F 13/211 463/8 |
| 2007/0060336 A1 * | 3/2007 | Marks | ................. | A63F 13/5372 463/30 |

(Continued)

FOREIGN PATENT DOCUMENTS

JP 2007-080002 A 3/2007
JP 2008-132249 A 6/2008

*Primary Examiner* — Joe H Cheng
(74) *Attorney, Agent, or Firm* — Cowan, Liebowitz & Latman, P.C.

(57) ABSTRACT

An information processing device includes at least one memory and at least one processor which function as: an acquisition unit configured to acquire operation information of a two-dimensional operation performed on a controller; and a control unit configured to control an object displayed on a display device based on the operation information and a correspondence relationship between an operation coordinate system for determining an operation direction of the two-dimensional operation performed on the controller and a display coordinate system for determining a display position of the display device.

15 Claims, 11 Drawing Sheets

(56) References Cited

U.S. PATENT DOCUMENTS

| | | | |
|---|---|---|---|
| 2008/0100825 A1* | 5/2008 | Zalewski | A63F 13/42 356/28 |
| 2009/0122030 A1 | 5/2009 | Morimoto et al. | |
| 2009/0231425 A1* | 9/2009 | Zalewski | A63F 13/50 348/142 |
| 2023/0245377 A1* | 8/2023 | Nakamura | G06F 9/445 345/419 |
| 2023/0368483 A1* | 11/2023 | Nakamura | G06T 19/20 |

* cited by examiner

INFORMATION PROCESSING DEVICE AND INFORMATION PROCESSING METHOD

This application claims priority under 35 U.S.C. § 119 of Japanese Application No. JP 2022-140070 filed on Sep. 2, 2022, the disclosure of which is incorporated by reference.

BACKGROUND OF THE INVENTION

Field of the Invention

The present invention relates to an information processing device and an information processing method.

Description of the Related Art

There is an xR system in which a virtual object can be rendered on a display device and the virtual object can be controlled with a controller. Such xR systems may move virtual objects in applications such as games or simulations. In this case, the xR system detects a user operation using a device provided in the controller, and controls the virtual object according to the user operation.

In order to reflect the user operation in the control of the virtual object as intended by the user, it may be necessary to adjust the orientation of the controller to a specific orientation before operating the controller.

However, depending on the shape or the like of the controller, it may be difficult for the user to recognize the orientation of the controller. In addition, when the display device is worn on the head and the user's field of vision is blocked, it is more difficult for the user to recognize the orientation of the controller.

In view of this, Japanese Patent Application Laid-Open No. 2007-80002 discloses a technique for specifying the position of the controller by detecting a marker installed outside with a camera of the controller, and moving the virtual object based on information on the position and the user operation.

However, in Japanese Patent Application Laid-Open No. 2007-80002, in order to specify the position of the controller, the camera of the controller needs to detect the marker, and the controller needs to be pointed in the direction in which the marker is present. For this reason, in a case where the controller and the marker are blocked by an obstacle or the like, the position of the controller cannot be specified, and the virtual object on the display device cannot be controlled appropriately.

SUMMARY OF THE INVENTION

The technique of the present invention enables a controller to be used to more appropriately control an object displayed on a display device.

An aspect of the invention is an information processing device including at least one memory and at least one processor which function as: an acquisition unit configured to acquire operation information of a two-dimensional operation performed on a controller; and a control unit configured to control an object displayed on a display device based on the operation information and a correspondence relationship between an operation coordinate system for determining an operation direction of the two-dimensional operation performed on the controller and a display coordinate system for determining a display position of the display device.

An aspect of the invention is an information processing device including at least one memory and at least one processor which function as: an acquisition unit configured to acquire operation information of a two-dimensional operation performed on a controller; and a control unit configured to control an object displayed on a display device based on the operation information and a difference between movement information of the controller from a reference state of the controller and movement information of the display device from a reference state of the display device.

An aspect of the invention is an information processing method including: an acquisition step of acquiring operation information of a two-dimensional operation performed on a controller; and a control step of controlling an object displayed on a display device based on the operation information and a correspondence relationship between an operation coordinate system for determining an operation direction of the two-dimensional operation performed on the controller and a display coordinate system for determining a display position of the display device.

An aspect of the invention is an information processing method including: an acquisition step of acquiring operation information of a two-dimensional operation performed on a controller; and a control step of controlling an object displayed on a display device based on the operation information and a difference between movement information of the controller from a reference state of the controller and movement information of the display device from a reference state of the display device.

Further features of the present invention will become apparent from the following description of exemplary embodiments with reference to the attached drawings.

DESCRIPTION OF THE EMBODIMENTS

Hereinafter, embodiments of the present invention will be described with reference to the drawings.

Figure 1:
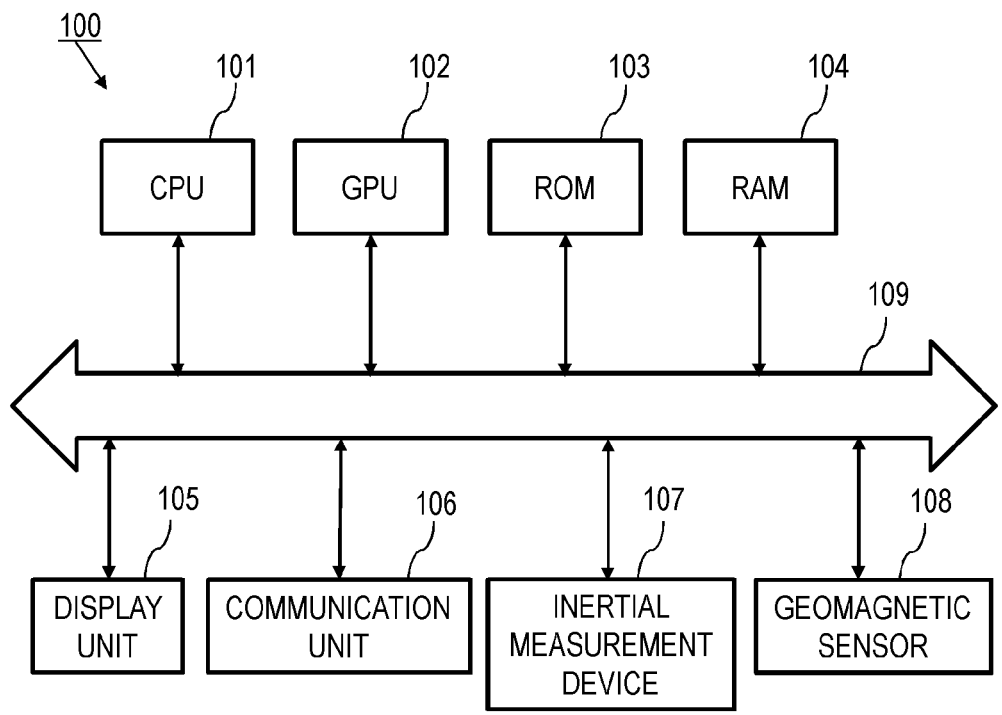
FIG. 1 is a configuration diagram of a display device.

FIG. 1 shows a configuration example of a display device 100. The display device 100 is, for example, a head-mounted display (HMD) worn on the head of a user. The display device 100 has a CPU 101, a GPU 102, a ROM 103, a RAM 104, a display unit 105, a communication unit 106, an inertial measurement device 107, a geomagnetic sensor 108, and a system bus 109.

The CPU 101 is a control unit that controls each component connected to the system bus 109. The CPU 101 uses the RAM 104 as a work memory to execute programs stored in the ROM 103. With this, the CPU 101 controls each component.

The GPU 102 is a graphics processing device that renders a virtual object in a virtual space. The programs stored in the ROM 103 include a program for realizing processing for correcting operation information of the controller 200, which will be described later.

The display unit 105 is an output device (a liquid crystal panel, an organic EL panel, etc.) that displays rendered graphics.

The communication unit 106 can perform wired or wireless communication. The communication unit 106 communicates with a communication unit 205 of the controller 200 to transmit and receive data.

The inertial measurement device 107 is a sensor that detects the posture and movement of the display device 100. The geomagnetic sensor 108 is a sensor that detects the bearing (orientation) of the display device 100.

Note that the display device 100 may also include an information processing device (display control device) that controls the display unit 105, and the display unit 105. In this case, the information processing device has components (the CPU 101, the inertial measurement device 107, the geomagnetic sensor 108, etc.) other than the display unit 105 of the display device 100.

Figure 2:
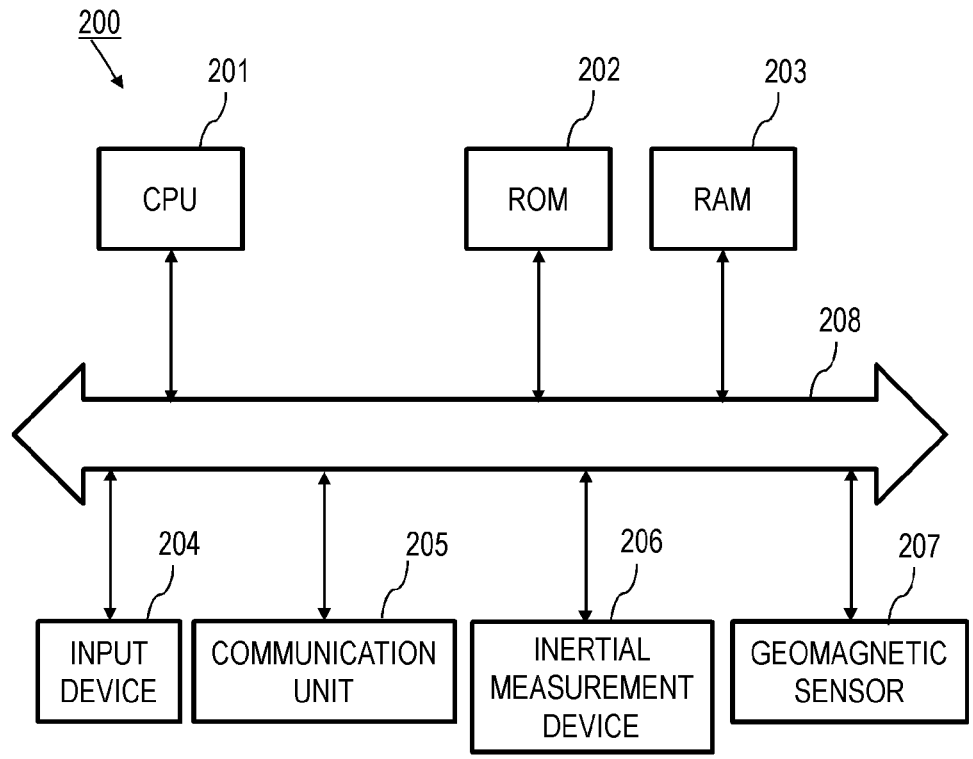
FIG. 2 is a configuration diagram of a controller.
Figure 3:
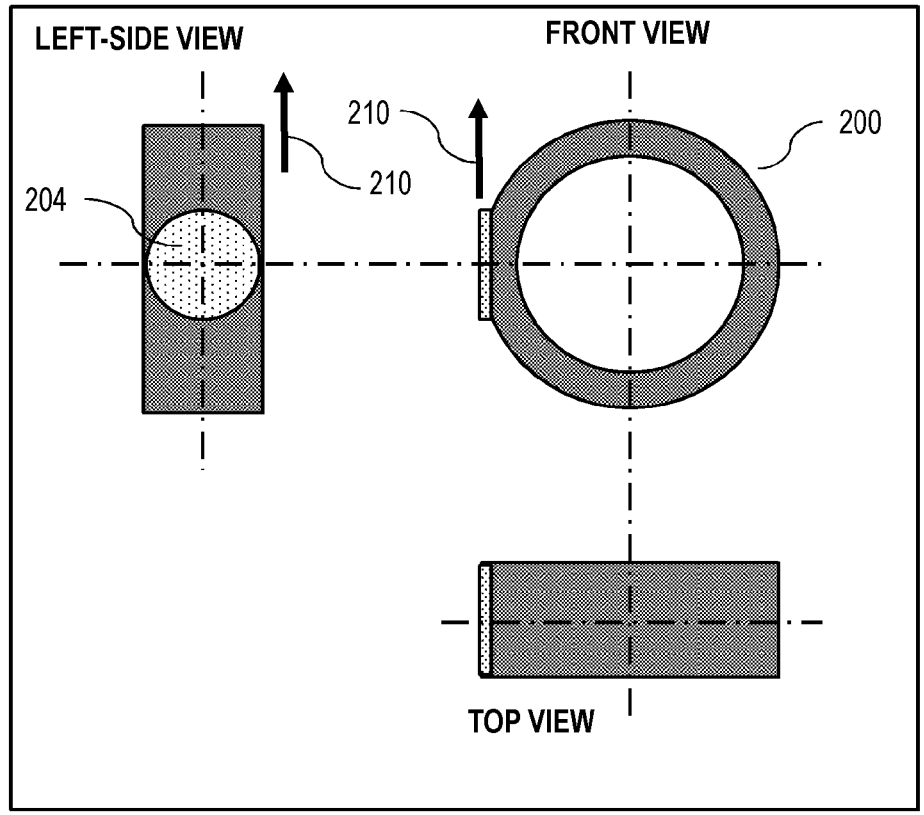
FIG. 3 is an external view of the controller.

FIG. 2 shows a configuration example of the controller 200. The controller 200 is, for example, a ring-shaped controller that can be worn on a finger of the user, as shown in FIG. 3. The controller 200 has a CPU 201, a ROM 202, a RAM 203, an input device 204, a communication unit 205, an inertial measurement device 206, a geomagnetic sensor 207, and a system bus 208.

The CPU 201 is a control unit that controls each component connected to the system bus 208. The CPU 201 uses the RAM 203 as a work memory to execute programs stored in the ROM 202. With this, the CPU 201 controls each component.

The programs stored in the ROM 202 include a program that realizes processing for transmitting later-described operation information and state information (information on the posture, movement, or bearing) of the controller 200 to the display device 100.

The input device 204 is a device that detects a user operation. The input device 204 is provided, for example, on a side surface of the ring-shaped controller 200 as shown in FIG. 3. The input device 204 in this embodiment is a touch pad sensor (optical track pad) capable of sensing a planar movement amount (a two-dimensional operation performed by the user). However, the input device 204 may be any operation member (a stick, a touch panel, etc.) as long as it is an operation member capable of receiving a planar movement operation.

The communication unit 205 can perform wired or wireless communication. The communication unit 205 communicates with the communication unit 106 of the display device 100 to transmit and receive data.

The inertial measurement device 206 is a sensor that detects the posture and movement of the controller 200. The geomagnetic sensor 207 is a sensor that detects the bearing (orientation) of the controller 200.

Operation Coordinate System and Display Coordinate System

An operation coordinate system C of the controller 200 and a display coordinate system D of the display device 100 will be described with reference to FIGS. 4 and 5. The operation coordinate system C of the controller 200 is a two-dimensional coordinate system of the touch pad sensor of the controller 200 and is a coordinate system for determining an operation direction of a two-dimensional operation. The display coordinate system D of the display device 100 is a two-dimensional coordinate system for determining a display position on the display device 100 (display unit 105).

It should be noted that hereinafter, the orientation of the controller 200 is an orientation 210, which is one of the directions parallel to the surface of the touch pad sensor of the input device 204, as shown in FIG. 3. The orientation of the display device 100 is an orientation 211 in the forward direction (front direction) of the display device 100 (display unit 105), as shown in FIG. 4. In this embodiment, the orientation 210 corresponds to a Y-axis direction Cy of the operation coordinate system C, and the orientation 211 corresponds to a Y-axis direction Dy of the display coordinate system D.

Figure 4:
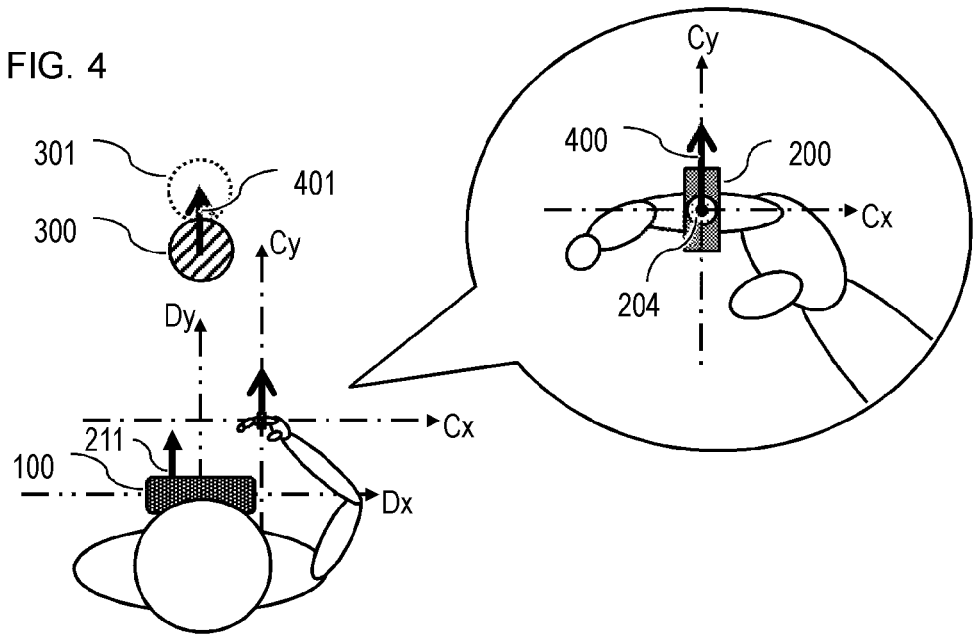
FIG. 4 is a diagram illustrating an operation coordinate system and a display coordinate system.
Figure 5:
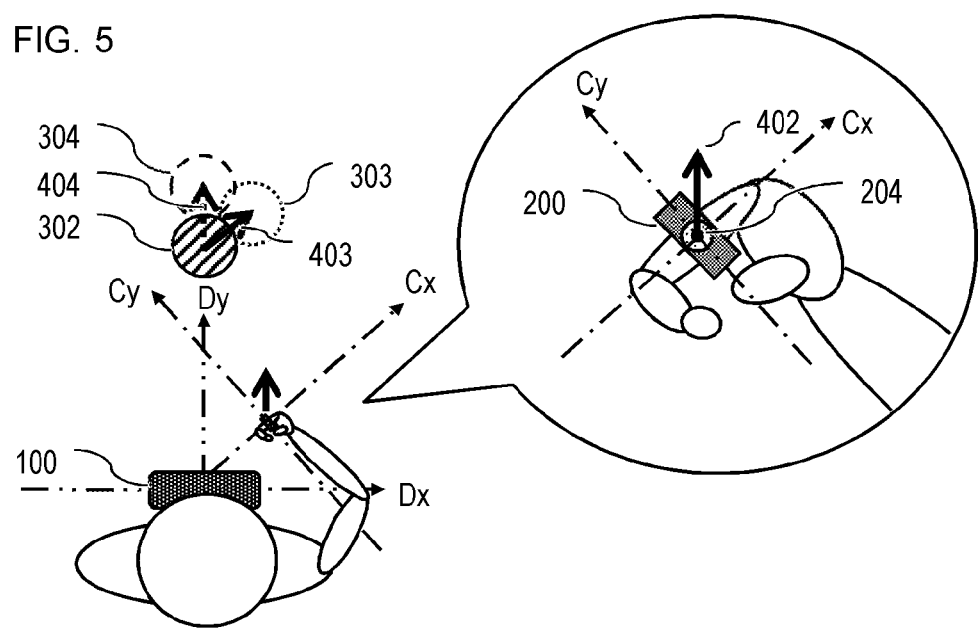
FIG. 5 is a diagram illustrating the operation coordinate system and the display coordinate system.

FIGS. 4 and 5 are diagrams expressing a composite space (a space in which a virtual space and a real space are combined) represented by an image displayed on the display device 100. With reference to FIGS. 4 and 5, an example will be described in which a virtual object displayed (rendered) on the display device 100 is moved while the user wears the display device 100 on his or her head and wears the controller 200 on a finger.

FIG. 4 shows a composite space in a case where both the display device 100 and the controller 200 face the front direction of the user. In the composite space (virtual space), a virtual object 300 is at a position (in the air) spaced a moderate distance away from the user's eyes.

In FIG. 4, the orientation 210 and the orientation 211 coincide with each other, and the two axis directions (X-axis direction and Y-axis direction) of the operation coordinate system C and the two axis directions of the display coordinate system D coincide with each other. That is, the X-axis direction Cx of the operation coordinate system C and the X-axis direction Dx of the display coordinate system D coincide with each other, and the Y-axis direction Cy of the operation coordinate system C and the Y-axis direction Dy of the display coordinate system D coincide with each other.

The input device 204 of the controller 200 detects a user operation 400 (two-dimensional operation in the operation coordinate system) for moving the virtual object 300 displayed on the display device 100. Then, the controller 200 transmits information (operation information) on the user operation 400 corresponding to frontward sliding of the finger by the user to the display device 100.

The display device 100 calculates movement information 401 indicating a movement vector (movement amount and movement direction) of the virtual object 300 according to the received operation information of the user operation 400. For example, the display device 100 multiplies each of an X-axis direction component and a Y-axis direction component of the user operation 400 by a constant. Then, the display device 100 calculates movement information 401 indicating a vector such that the X-axis direction component multiplied by the constant is treated as "the X-axis direction component in the display coordinate system" and the Y-axis direction component multiplied by the constant is treated as "the Y-axis direction component in the display coordinate system". Thereafter, the display device 100 moves the virtual object 300 to a movement target position 301 according to the movement information 401. In this case, as described above, since the operation coordinate system C and the display coordinate system D have the same two axis directions, the virtual object 300 moves in the direction in which the user actually performed the sliding operation.

FIG. 5 shows a composite space in which the controller 200 is in an orientation different from that of the display device 100 due to the user unconsciously clenching his or her hand or the like.

In the composite space (virtual space) shown in FIG. 5, the virtual object 302 is at a position (in the air) spaced a moderate distance away from the user's eyes. At this time, the orientations 210 and 211 do not coincide with each other, and the two axis directions (the X-axis direction and the Y-axis direction) of the operation coordinate system C of the controller 200 and the two axis directions of the display coordinate system D of the display device 100 do not coincide with each other.

The input device 204 of the controller 200 detects the user operation 400, which is a two-dimensional operation for moving the virtual object 300 displayed on the display device 100. Then, the controller 200 transmits to the display device 100, the operation information of the user operation 402 corresponding to the frontward sliding of the finger performed by the user. The display device 100 calculates the movement information 403 of the virtual object according to the operation information on the user operation 402. Here, since the two axis directions of the operation coordinate system C and the two axis directions of the display coordinate system D do not coincide with each other, movement information 403 is calculated such that a movement different from the user's intention (intention to move the virtual object 300 frontward) is executed. For this reason, the virtual object 302 moves to a movement target position 303 different from the movement target position 304 intended by the user.

In view of this, in the present embodiment, the display device 100 corrects the operation information of the user operation 402 according to the correspondence relationship between the operation coordinate system C and the display coordinate system D, and calculates the movement information 404 based on the corrected operation information. Then, the display device 100 moves the virtual object 300 to the appropriate movement target position 304 according to the movement information 404.

Processing for correcting user operation information according to the correspondence relationship between the operation coordinate system C and the display coordinate system D will be described below. Also, for example, the correspondence relationship between the operation coordinate system C and the display coordinate system D is a relationship indicated by the difference between the orientation of the operation coordinate system C (orientation of the reference direction (Y-axis direction, etc.) of the operation coordinate system C) and the orientation of the display coordinate system D (orientation of the reference direction (Y-axis direction, etc.) of the display coordinate system D).

Processing of Controller

Figure 6:
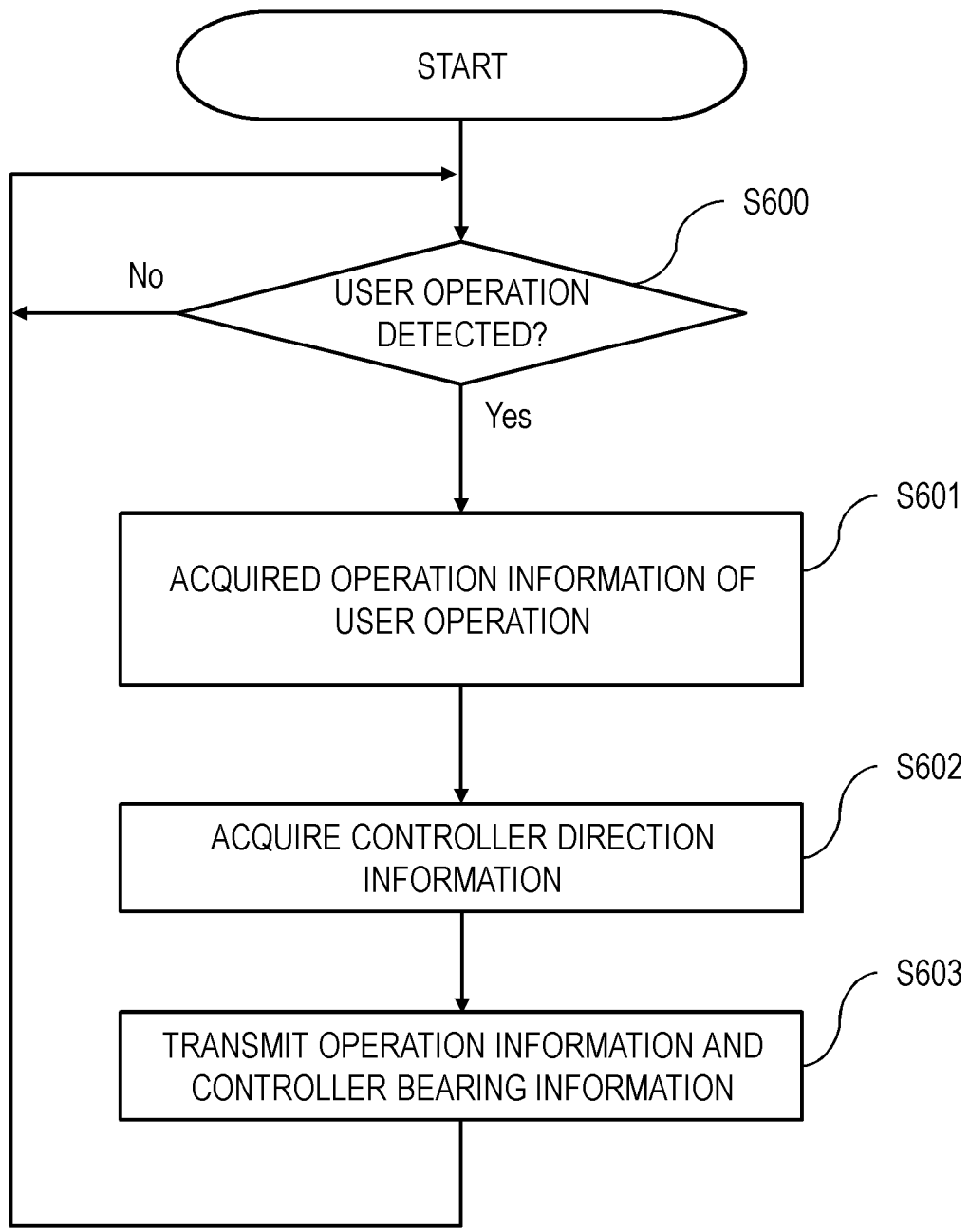
FIG. 6 is a flow chart showing processing of the controller.

FIG. 6 is a flow chart showing processing of the controller 200 for moving the virtual object to a position that matches the user's intention.

In step S600, the CPU 201 determines whether or not the input device 204 has detected a user's two-dimensional operation (for example, a slide operation) as a user operation. If it is determined that a user operation has been detected, the processing proceeds to step S601. If it is determined that no user operation has been detected, the processing of step S600 is repeated.

In step S601, the CPU 201 acquires operation information (operation vector; operation amount and operation direction) of a user operation in the operation coordinate system C.

In step S602, the CPU 201 acquires information on the orientation of the controller 200 in the reference coordinate system G. Hereinafter the orientation of the controller 200 in the reference coordinate system G is referred to as "controller bearing information". Although the reference coordinate system G will be described later in detail, for example, the reference coordinate system G is a coordinate system according to the measurement values of the geomagnetic sensors 108 and 207. Specifically, the reference coordinate system G is, for example, a coordinate system in which the east-west direction is the X-axis direction and the north-south direction is the Y-axis direction.

In step S603, the CPU 201 controls the communication unit 205 to transmit the controller bearing information and operation information to the display device 100.

Processing of Display Device

Processing of the display device 100 for moving the virtual object to a position that matches the user's intention will be described with reference to the flow chart of FIG. 7 and FIGS. 8 to 11.

In step S700, the CPU 101 displays, on the display unit 105, the virtual object to be operated by the user.

In step S701, the CPU 101 determines whether or not data has been received from the controller 200 via the communication unit 106. If it is determined that data has been received from the controller 200, the processing proceeds to step S702. If it is determined that data has not been received from the controller 200, the processing of step S701 is repeated.

In step S702, the CPU 101 acquires the operation information and the controller bearing information from the controller 200 from the data received in step S701.

In step S703, the CPU 101 acquires information on the orientation of the display device 100 in the reference coordinate system G. Hereinafter the information on the orientation of the display device 100 in the reference coordinate system G is referred to as "display bearing information".

In step S704, the CPU 101 calculates (determines) a correction angle $\theta$ indicating the difference between the controller bearing information and the display bearing information. The correction angle $\theta$ is an angle that indicates the difference between the orientation of the operation coordinate system C and the orientation of the display coordinate system D (that is, the correspondence relationship between the operation coordinate system C and the display coordinate system D). Then, the CPU 101 corrects the operation information based on the correction angle $\theta$. Specifically, the CPU 101 corrects the operation information by adjusting the direction of the vector indicated by the operation information by the correction angle θ. Thereafter, the CPU 101 determines the movement information based on the corrected operation information.

In step S705, the CPU 101 moves the virtual object displayed on the display unit 105 according to the movement information. Note that in addition to moving the virtual object, the CPU 101 may also perform other control of the display of the display device 100 (e.g., control of the size of the virtual object, rendering of a new virtual object in the virtual space, etc.) according to the movement information.

Figure 7:
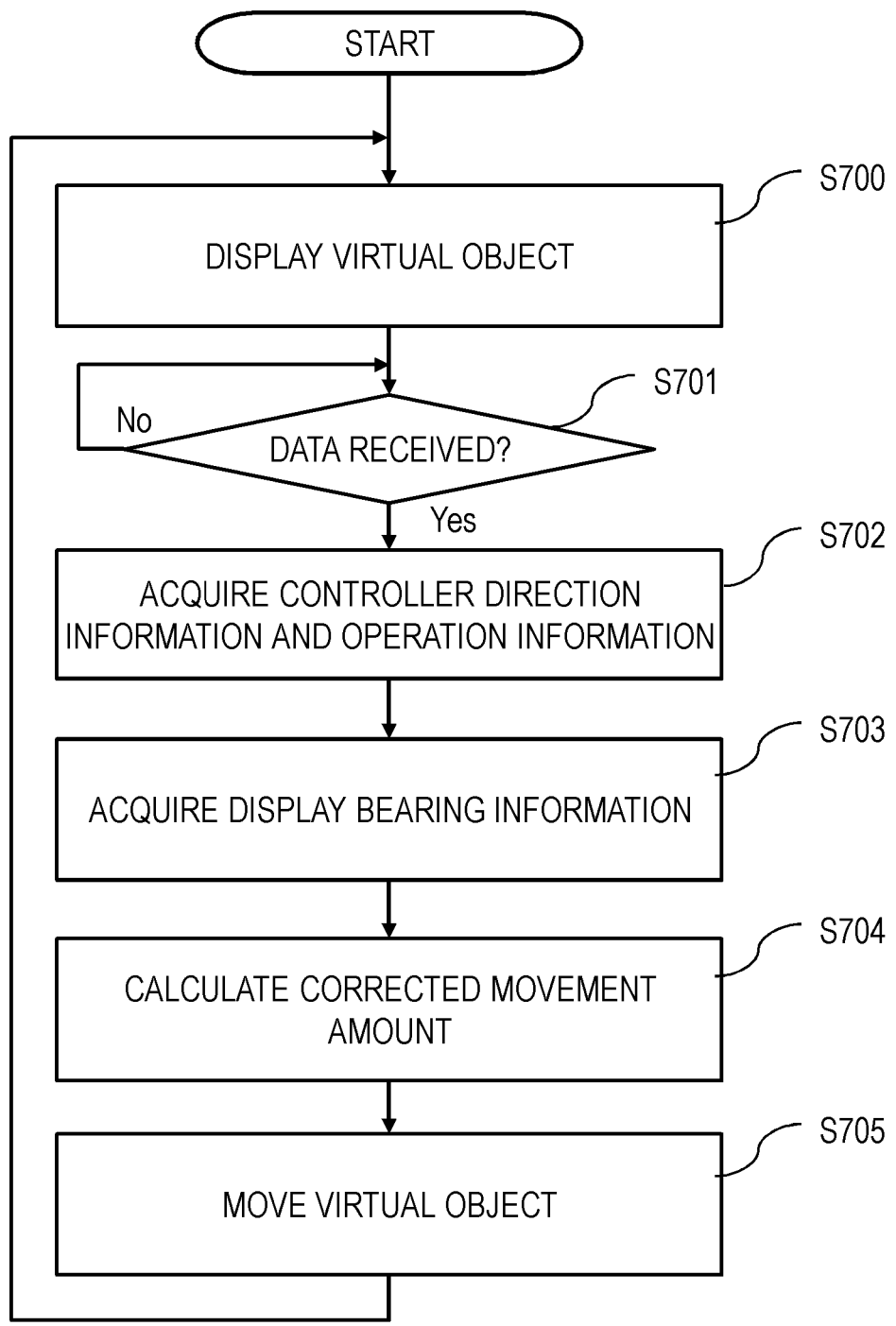
FIG. 7 is a flow chart showing processing of the display device.
Figure 8:
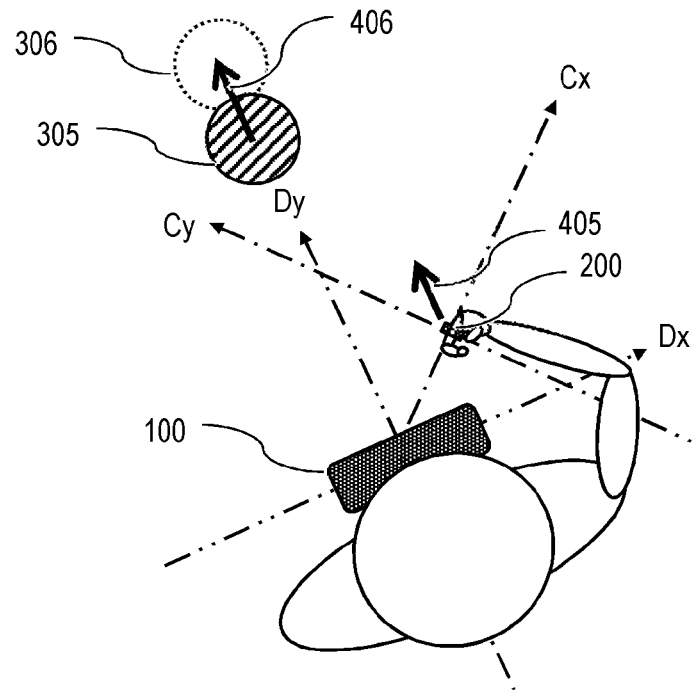
FIG. 8 is a diagram illustrating the operation coordinate system and the display coordinate system in a case where operation information has been corrected.

FIG. 8 is a diagram illustrating a case where the virtual object 305 has been moved according to the flow chart of FIG. 7. The virtual object 305 is at a position (in the air) spaced an appropriate distance away from the user's eyes. At this time, the display device 100 and the controller 200 face different directions. That is, the two axis directions (orientation) of the operation coordinate system C and the two axis directions (orientation) of the display coordinate system D do not coincide with each other.

The input device 204 detects a user operation 405 for moving the virtual object 305 displayed on the display device 100. The controller 200 transmits the operation information of the user operation 405 to the display device 100 via the communication unit 205. The display device 100 corrects the operation information based on the correction angle θ indicating the correspondence relationship between the operation coordinate system C and the display coordinate system D, and calculates the movement information 406 of the virtual object based on the corrected operation information. This makes it possible for the display device 100 to move the virtual object 305 to an appropriate movement target position 306 based on the movement information 406.

Another Method for Calculating Correction Angle

Although the method for calculating the correction angle θ indicating the difference between the controller bearing information and the display bearing information has been described above, another method can be used, and therefore that method will be described below.

Figure 9:
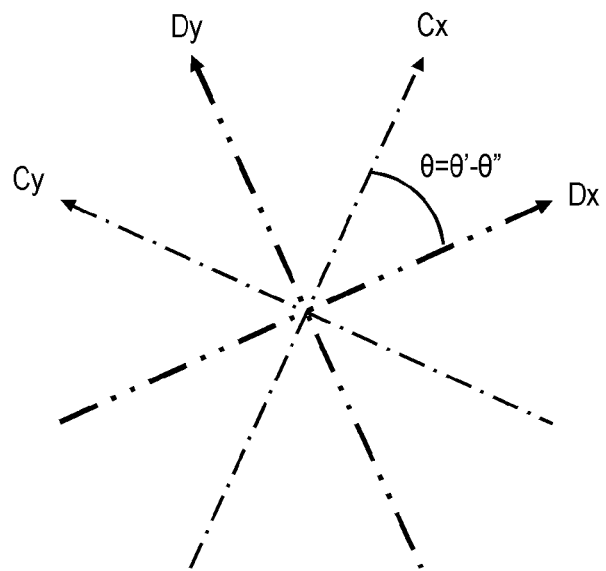
FIG. 9 is a diagram illustrating a correction angle.
Figure 10:
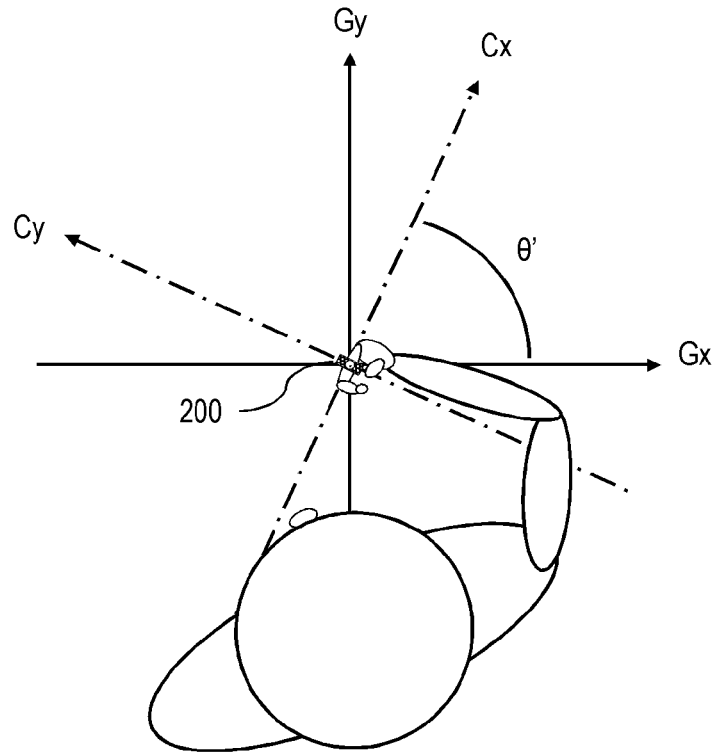
FIG. 10 is a diagram illustrating an operation coordinate change angle.
Figure 11:
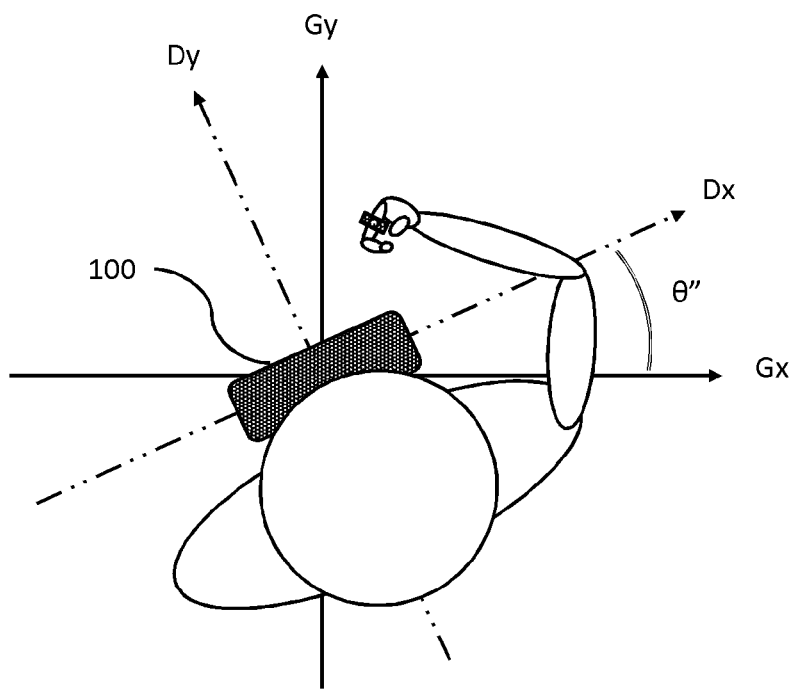
FIG. 11 is a diagram illustrating a display coordinate change angle.

FIG. 9 shows a correction angle θ indicating the difference between the orientation of the operation coordinate system C and the orientation of the display coordinate system D (the difference between the X-axis directions or the difference between the Y-axis directions). FIG. 10 shows an operation coordinate change angle θ' indicating the difference between the orientation of the operation coordinate system C and the orientation of the reference coordinate system G. FIG. 11 shows a display coordinate change angle θ", which is the difference between the orientation of the display coordinate system D and the orientation of the reference coordinate system G.

For this reason, the correction angle θ is an angle obtained by subtracting the display coordinate change angle θ" from the operation coordinate change angle θ', as shown in Formula 1 below. Note that in the example of FIG. 9, the orientation of the operation coordinate system C and the orientation of the display coordinate system D are tilted in the same direction in a view from the orientation of the reference coordinate system G, and therefore the correction angle θ can be calculated using Formula 1. On the other hand, if the orientation of the operation coordinate system C and the orientation of the display coordinate system D are tilted in different directions in a view from the orientation of the reference coordinate system G, the correction angle θ can be calculated by adding together the operation coordinate change angle θ' and the display coordinate change angle θ".

$$\theta = \theta' - \theta'' \quad \text{(Formula 1)}$$

In view of this, in step S704 of the flow chart of FIG. 7, the CPU 101 may also obtain the operation coordinate change angle θ' (difference between the orientation of the reference coordinate system G and the orientation of the operation coordinate system C) and the display coordinate change angle θ" (difference between the orientation of the reference coordinate system G and the orientation of the display coordinate system D). Then, the CPU 101 may obtain a correction angle θ indicating the difference between the orientation of the operation coordinate system C and the orientation of the display coordinate system D based on the operation coordinate change angle θ' and the display coordinate change angle θ". The CPU 101 corrects the operation information of the user operation according to the correction angle θ, and determines the movement information of the virtual object.

Note that the CPU 101 may also obtain the correction angle θ indicating the difference between the orientation of the display device 100 and the orientation of the controller 200 based on a captured image of the controller 200 captured by the camera of the display device 100.

Basic Coordinate System Example 1

Figure 12:
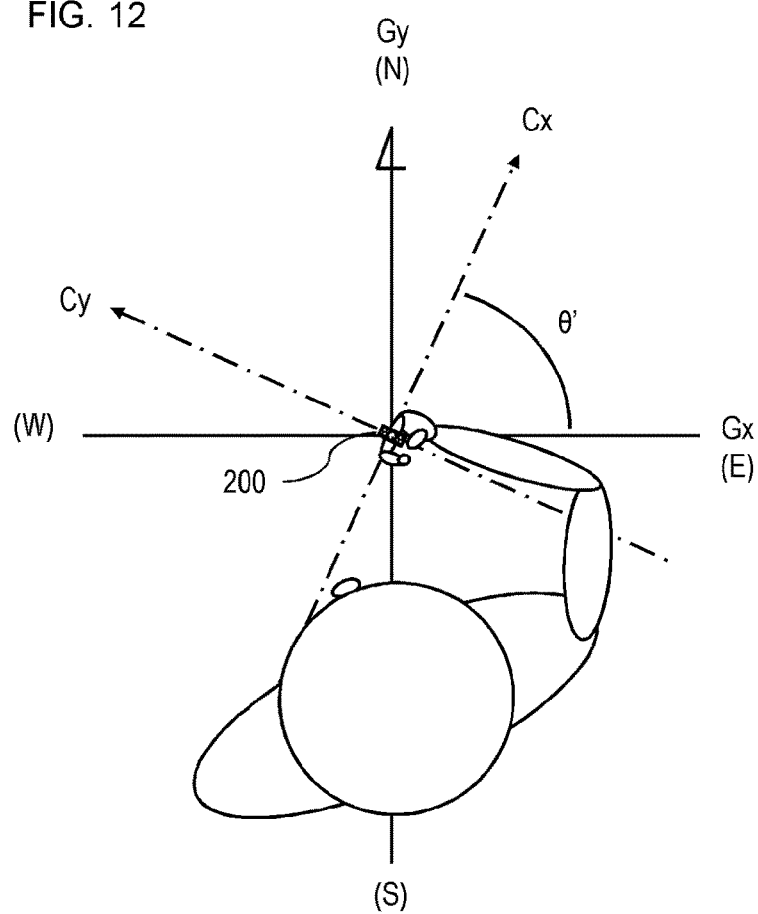
FIG. 12 is a diagram illustrating an example of a basic coordinate system.
Figure 13:
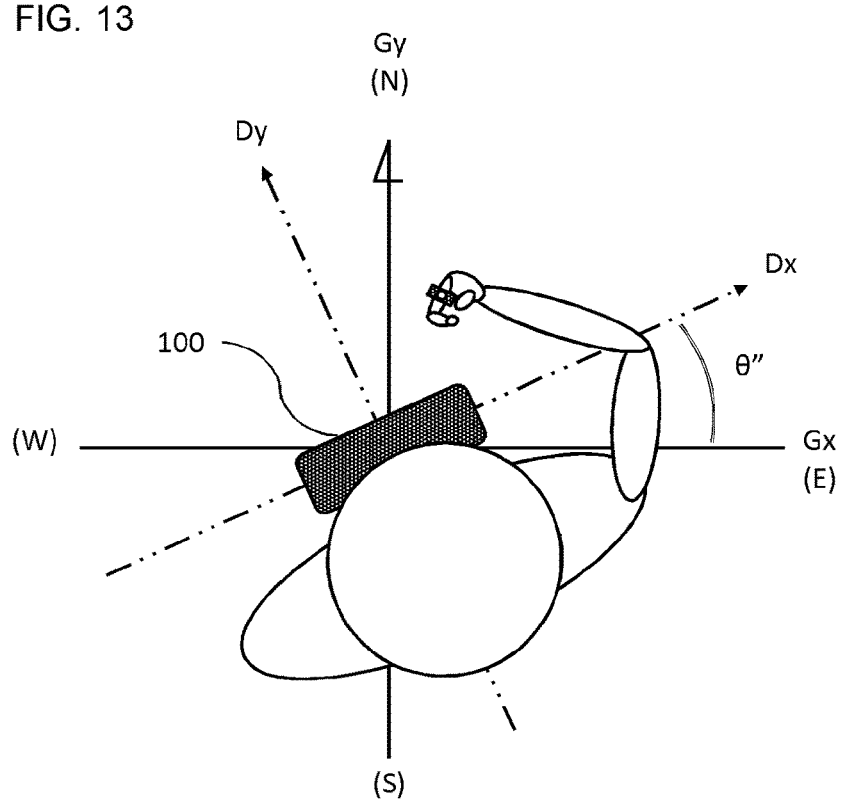
FIG. 13 is a diagram illustrating an example of a basic coordinate system.

With reference to FIGS. 12 and 13, an example of the reference coordinate system G according to the measured values by the geomagnetic sensors 207 and 108 will be described. For example, as shown in FIG. 12, based on the value (measured value) of the bearing obtained from the geomagnetic sensor 207, the CPU 201 sets the east direction (east-west direction) as the X-axis direction Gx of the reference coordinate system G and sets the north direction (north-south direction) as the Y-axis direction Gy of the reference coordinate system G. This makes it possible for the CPU 201 to calculate the controller bearing information indicating the orientation of the controller 200 in the reference coordinate system G.

Similarly, as shown in FIG. 13, based on the value of the bearing obtained from the geomagnetic sensor 108, the CPU 101 sets the east direction as the X-axis direction Gx of the reference coordinate system G and sets the north direction as the Y-axis direction Gy of the reference coordinate system G. This makes it possible for the CPU 101 to calculate the display bearing information indicating the orientation of the display device 100 in the reference coordinate system G.

Basic Coordinate System Example 2

Figure 14:
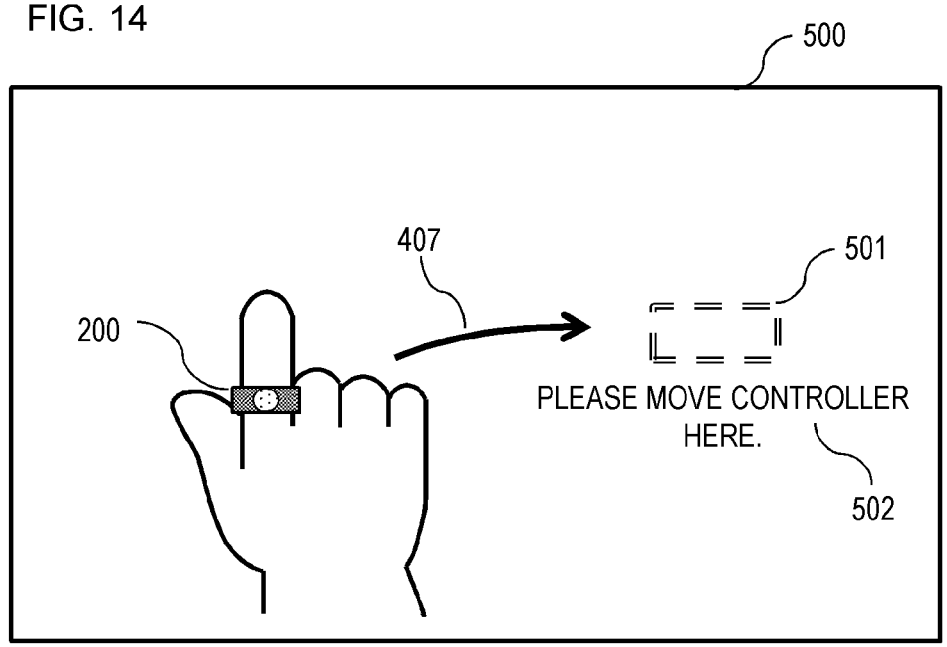
FIG. 14 is a diagram illustrating an example of a basic coordinate system.
Figure 15:
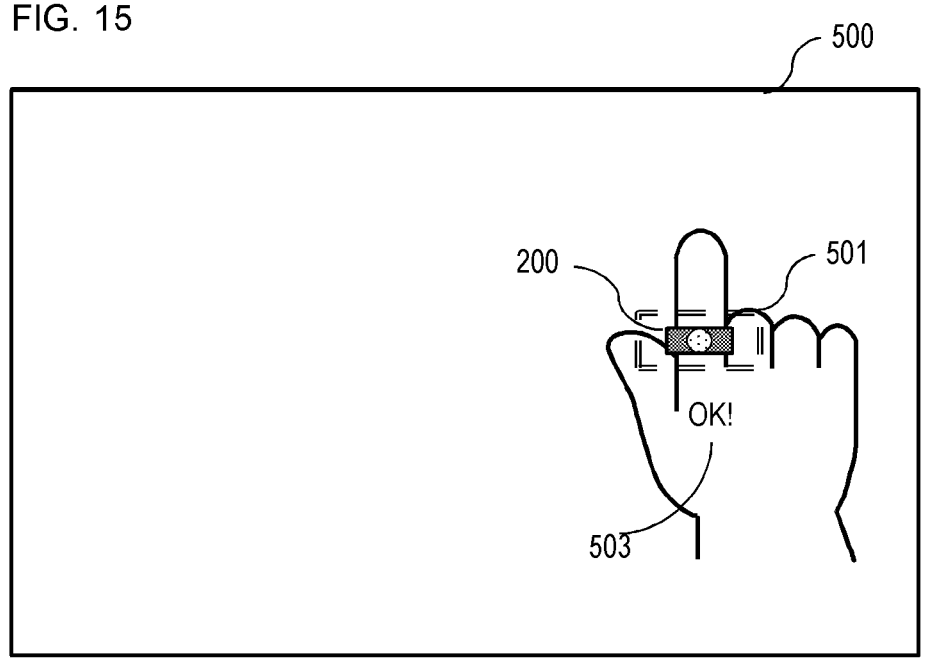
FIG. 15 is a diagram illustrating an example of a basic coordinate system.

With reference to FIGS. 14 and 15, an example of the reference coordinate system G according to the measured values measured by the inertial measurement device 206 and the inertial measurement device 107 will be described. For example, as shown in FIG. 14, the CPU 101 displays, on the display surface 500 of the display unit 105, UIs (UI 501 and UI 502) for establishing a specific positional relationship between the display device 100 and the controller 200. Thereby, the CPU 101 prompts the user to move the controller 200 to a position indicated by the UI 501. The user moves the position of the controller 200 through a movement operation 407 performed on the controller 200. The position indicated by the UI 501 is, for example, a position where it is assumed that the user can easily operate the controller 200.

When the controller 200 reaches the position of the UI 501, the CPU 101 determines that the display device 100 and the controller 200 are in a specific positional relationship, and performs a notification 503 as shown in FIG. 15 to the user. The notification 503 indicates to the user that the display device 100 and the controller 200 have reached the specific positional relationship. In a state where the display device 100 and the controller 200 are in the specific positional relationship, the CPU 101 uses the display coordinate system D of the display device 100 as a reference coordinate system G' and uses the operation coordinate system C of the controller 200 as a reference coordinate system G''. Information on the set reference coordinate system G' and information on the set reference coordinate system G'' are stored in the RAM 104.

Thereafter, the CPU 101 calculates the accumulated movement information (movement angle measurable using the inertial measurement device 107) of the display device 100 from this state (reference state) as the display coordinate change angle $\theta''$. Then, the CPU 201 calculates the accumulated movement information (movement angle measurable using the inertial measurement device 206) of the controller 200 from this state (reference state) as the operation coordinate change angle $\theta'$. Thereafter, the CPU 101 calculates a correction angle $\theta$ indicating the correspondence relationship between the operation coordinate system C and the display coordinate system D based on the difference between the operation coordinate change angle $\theta'$ and the display coordinate change angle $\theta''$.

Basic Coordinate System Example 3

Figure 16:
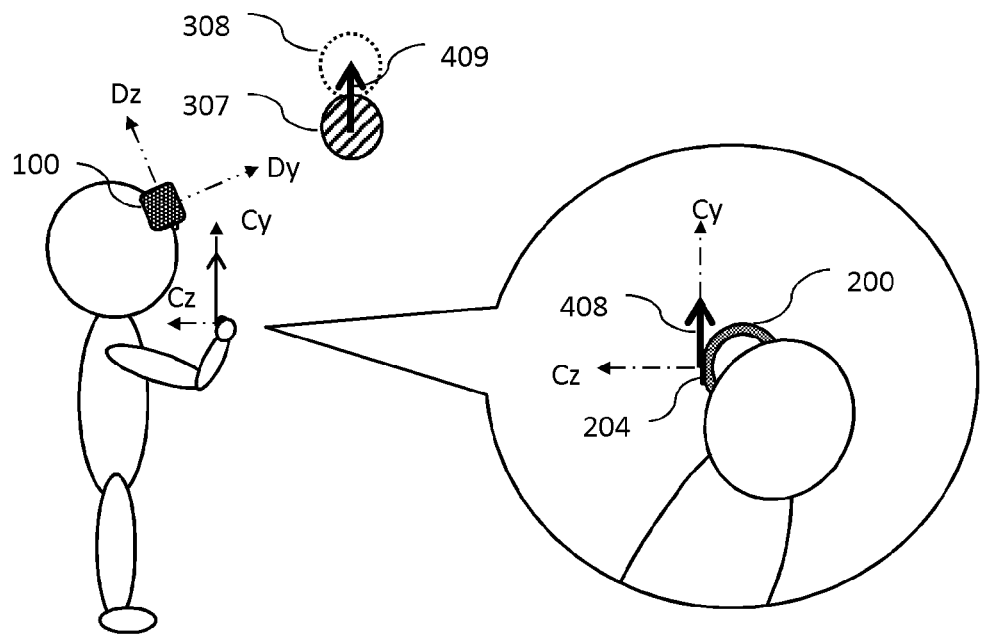
FIG. 16 is a diagram illustrating an example of a basic coordinate system.

An example of the reference coordinate system G according to the measured values measured by the inertial measurement device 206 and the inertial measurement device 107 will be described with reference to FIGS. 16 to 19. FIG. 16 shows an example of moving a virtual object in a direction intended by the user according to a two-dimensional operation performed on the controller 200. The input device 204 detects a user operation 408 for moving a virtual object 307 displayed on the display device 100. The CPU 101 calculates the movement information 409 of the virtual object 307 based on operation information of the user operation 408, and moves the virtual object 307 to a movement target position 308 of the virtual object.

Figure 17:
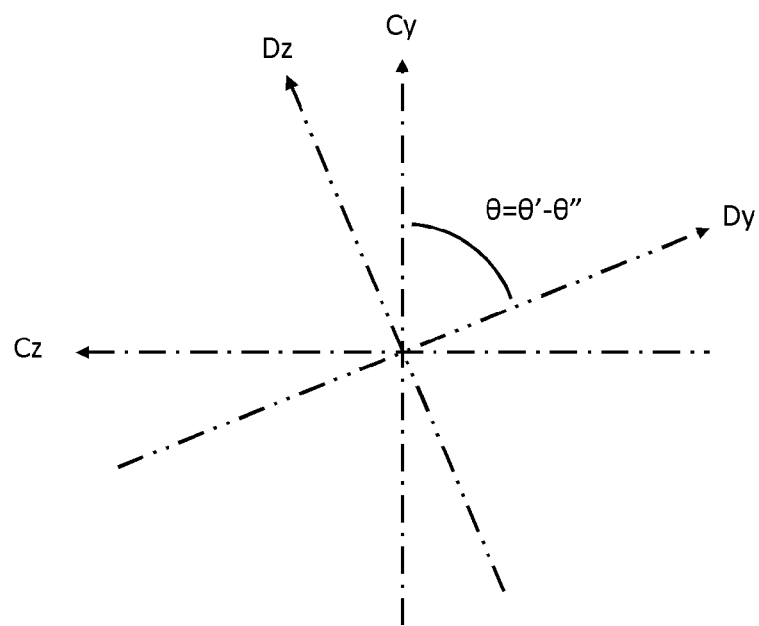
FIG. 17 is a diagram illustrating an example of a basic coordinate system.
Figure 18:
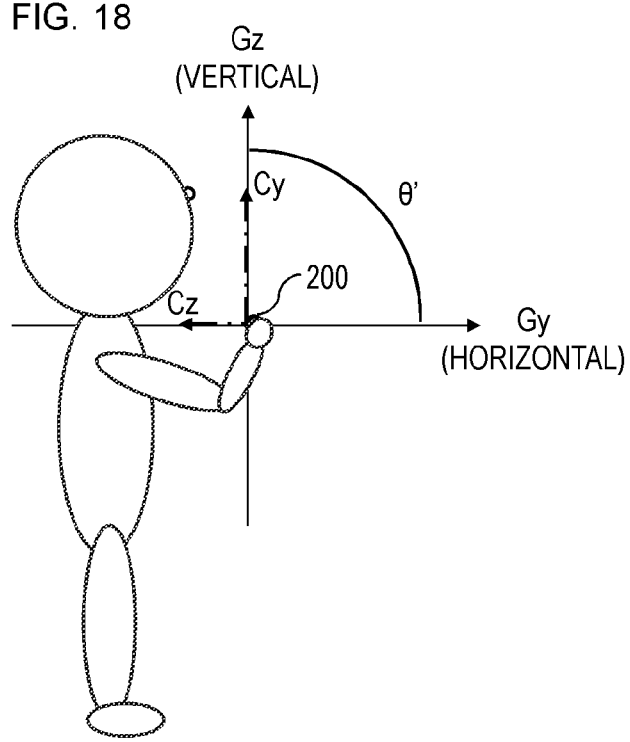
FIG. 18 is a diagram illustrating an example of a basic coordinate system.

FIG. 17 represents the correction angle $\theta$ in the state shown in FIG. 16. FIG. 18 shows an operation coordinate change angle $\theta'$ indicating the difference between the orientation of the operation coordinate system C and the orientation of the reference coordinate system G. In this case, for example, the horizontal direction is the X-axis direction Cx of the operation coordinate system C, which is parallel to the surface of a touch pad sensor. Also, the vertical direction is the Y-axis direction Cy of the operation coordinate system C. Then, by using the value of the inertial measurement device 206, the CPU 201 sets the horizontal direction (the horizontal direction and the front direction of the user, etc.) as the Y-axis direction Gy of the reference coordinate system G, and the vertical direction as the Z-axis direction Gz of the reference coordinate system G.

Figure 19:
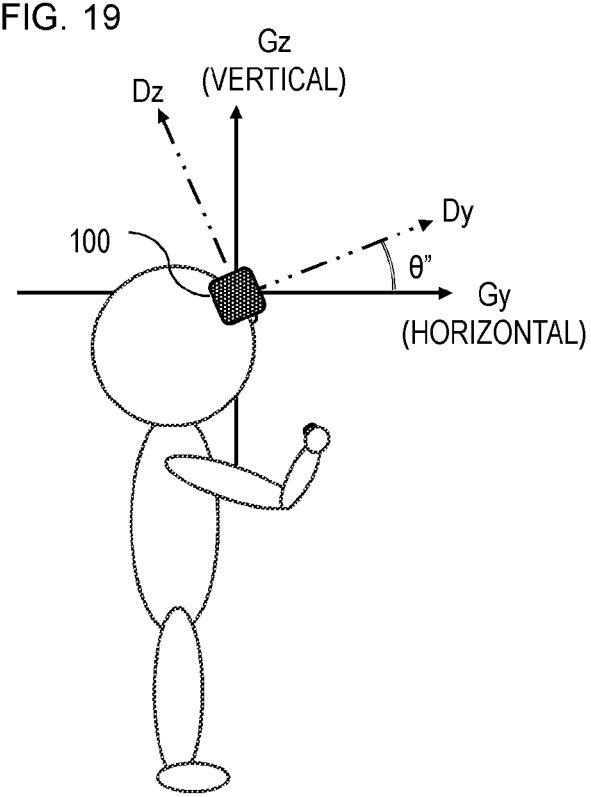
FIG. 19 is a diagram illustrating an example of a basic coordinate system.

FIG. 19 shows a display coordinate change angle $\theta''$ that indicates the difference between the orientation of the display coordinate system D and the orientation of the reference coordinate system G. At this time, by using the values of the inertial measurement device 107, the CPU 101 can set the horizontal direction as the Y-axis direction Gy of the reference coordinate system G and set the vertical direction as the Z-axis direction Gz of the reference coordinate system G. In such a case as well, the CPU 101 calculates the correction angle $\theta$ indicating the correspondence relationship between the operation coordinate system C and the display coordinate system D based on the difference between the operation coordinate change angle $\theta'$ and the display coordinate change angle $\theta''$ and corrects the operation information based on the correction angle $\theta$. For example, the CPU 101 rotates a vector indicated by the operation information about the X-axis (X-axis direction Cx) by the correction angle $\theta$.

According to this embodiment, the movement of the virtual object is controlled according to the correspondence relationship between the operation coordinate system C and the display coordinate system D. For this reason, the virtual object can be moved in the direction intended by the user (for example, in the same direction as the direction actually operated by the user). That is, the controller can be used to more appropriately control the display of the display device.

Note that the display device 100 corrects the operation information based on the correction angle $\theta$ and calculates the movement information according to the corrected operation information. On the other hand, the display device 100 may also correct the movement information based on the correction angle $\theta$ after calculating the movement information according to the operation information that has not been corrected.

According to the present invention, the controller can be used to more appropriately control the object displayed on the display device.

Also, in the above description, "if A is greater than or equal to B, the processing proceeds to step S1, and if A is smaller (lower) than B, the processing proceeds to step S2" may be replaced with "if A is greater (higher) than B, the processing proceeds to step S1, and if A is less than or equal to B, the processing proceeds to step S2". Conversely, "if A is greater (higher) than B, the processing proceeds to step S1, and if A is less than or equal to B, the processing proceeds to step S2" may also be replaced with "if A is greater than or equal to B, the processing proceeds to step S1, and if A is smaller (lower) than B, the processing proceeds to step S2". For this reason, as long as no contradiction arises, the expression "greater than or equal to A" may be replaced with "A or greater (higher; longer; more) than A" or "greater (higher; longer; more) than A")". On the other hand, the expression "less than or equal to A" may be replaced with "A or smaller (lower; shorter; less) than A" or "smaller (lower; shorter; less) than A". Also, "greater (higher; longer; more) than A" may be replaced with "greater than or equal to A", and "smaller (lower; shorter; less) than A" may be replaced with "less than or equal to A".

Although the present invention has been described above in detail based on preferred embodiments thereof, the present invention is not limited to these specific embodiments, and various modes that do not depart from the gist of the present invention are also encompassed in the present invention. Some of the above-described embodiments may also be combined with each other as appropriate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-140070, filed on Sep. 2, 2022, which is hereby incorporated by reference herein in its entirety.

What is claimed is:

1. An information processing device comprising at least one memory and at least one processor which function as:
   an acquisition unit configured to acquire operation information of a two-dimensional operation performed on a controller; and
   a control unit configured to control an object displayed on a display device based on the operation information and a correspondence relationship between an operation coordinate system for determining an operation direction of the two-dimensional operation performed on the controller and a display coordinate system for determining a display position of the display device.

2. The information processing device according to claim 1, wherein
   the controller has an operation member capable of receiving a planar movement operation, and
   the operation information is information on the two-dimensional operation performed on the operation member.

3. The information processing device according to claim 1, wherein
   the control unit corrects the operation information based on the correspondence relationship between the operation coordinate system and the display coordinate system, and
   the control unit controls the object based on the corrected operation information.

4. The information processing device according to claim 1, wherein
   the correspondence relationship between the operation coordinate system and the display coordinate system is a relationship indicated by a difference between an orientation of the operation coordinate system and an orientation of the display coordinate system.

5. The information processing device according to claim 4, wherein
   the control unit determines the difference between the orientation of the operation coordinate system and the orientation of the display coordinate system according to a difference between an orientation of the controller in a reference coordinate system and an orientation of the display device in the reference coordinate system.

6. The information processing device according to claim 5, wherein
   the reference coordinate system is a coordinate system according to a measured value measured by a geomagnetic sensor.

7. The information processing device according to claim 5, wherein
   the reference coordinate system is a coordinate system according to a measured value of an inertial measurement device.

8. The information processing device according to claim 4, wherein
   the control unit determines the difference between the orientation of the operation coordinate system and the orientation of the display coordinate system according to 1) a difference between an orientation of a reference coordinate system and the orientation of the operation coordinate system and 2) a difference between the orientation of the reference coordinate system and the orientation of the display coordinate system.

9. The information processing device according to claim 1, wherein
   the control unit controls the object by moving the object.

10. An information processing device comprising at least one memory and at least one processor which function as:
    an acquisition unit configured to acquire operation information of a two-dimensional operation performed on a controller; and
    a control unit configured to control an object displayed on a display device based on the operation information and a difference between movement information of the controller from a reference state of the controller and movement information of the display device from a reference state of the display device.

11. The information processing device according to claim 10, wherein
    the controller has an operation member capable of receiving a planar movement operation, and
    the operation information is information on the two-dimensional operation performed on the operation member.

12. An information processing method comprising:
    an acquisition step of acquiring operation information of a two-dimensional operation performed on a controller; and
    a control step of controlling an object displayed on a display device based on the operation information and a correspondence relationship between an operation coordinate system for determining an operation direction of the two-dimensional operation performed on the controller and a display coordinate system for determining a display position of the display device.

13. A non-transitory computer readable medium that stores a program, wherein the program causes a computer to perform operations included in the information processing method according to claim 12.

14. An information processing method comprising:
- an acquisition step of acquiring operation information of a two-dimensional operation performed on a controller; and
- a control step of controlling an object displayed on a display device based on the operation information and a difference between movement information of the controller from a reference state of the controller and movement information of the display device from a reference state of the display device.

15. A non-transitory computer readable medium that stores a program, wherein the program causes a computer to perform operations included in the information processing method according to claim 14.

\* \* \* \* \*